US 6,717,627 B2

(12) United States Patent
Senkler

(10) Patent No.: US 6,717,627 B2
(45) Date of Patent: Apr. 6, 2004

(54) INTEGRATED SCREEN PROTECTOR AND HOLDER

(75) Inventor: Charles E. Senkler, Knoxville, TN (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/891,072

(22) Filed: Jun. 25, 2001

(65) Prior Publication Data

US 2002/0196380 A1 Dec. 26, 2002

Related U.S. Application Data

(60) Provisional application No. 60/275,392, filed on Mar. 13, 2001.

(51) Int. Cl.[7] .................................................. H04N 5/65
(52) U.S. Cl. ........................................ 348/823; 312/7.2
(58) Field of Search ............................ 312/7.2, 223.1, 312/223.2; 248/918, 229.16, 229.11, 222.11, 222.12, 224.7; 348/818, 823, 836, 841, 842; 52/208, 204.593

(56) References Cited

U.S. PATENT DOCUMENTS

| 4,055,031 | A | * | 10/1977 | Okawa et al. | ......... 52/204.593 |
| 5,363,149 | A | * | 11/1994 | Furuno et al. | ................ 312/7.2 |
| 5,373,672 | A | * | 12/1994 | Schulz | ......................... 52/208 |
| 5,592,241 | A | * | 1/1997 | Kita et al. | .................... 348/823 |
| 5,887,959 | A | * | 3/1999 | Yuri | ........................... 312/7.2 |
| 6,012,257 | A | * | 1/2000 | Caplette | ................. 52/204.593 |
| 6,318,862 | B1 | * | 11/2001 | Sarayeddine | ................ 348/767 |
| 6,377,320 | B1 | * | 4/2002 | Ananian et al. | ............. 312/7.2 |
| 6,550,210 | B1 | * | 4/2003 | Levine et al. | .................. 52/208 |

FOREIGN PATENT DOCUMENTS

| JP | 06038151 | * | 2/1994 |
| JP | 07092564 | * | 4/1995 |
| JP | 09069994 | * | 3/1997 |
| JP | 10051713 | * | 2/1998 |
| JP | 11218843 | * | 8/1999 |

* cited by examiner

Primary Examiner—Lanna Mai
Assistant Examiner—Hanh V. Tran

(57) ABSTRACT

An integrated protective apparatus extruded from a PVC material for semi-rigidly attaching a planar protective element to a lens assembly and chassis in a projection television (PTV). The apparatus includes a plurality of channels, each configured to accept one or more of a plurality of lenses or protective elements. The apparatus can include molded protrusions that can be arranged to apply a retentive force against the lenses and protective elements supported within the channels.

20 Claims, 1 Drawing Sheet

INTEGRATED SCREEN PROTECTOR AND HOLDER

RELATED APPLICATIONS

This application claims the benefit of U.S. Provisional Application No. 60/275,392, filed Mar. 13, 2001.

FIELD OF THE INVENTION

This invention relates to the field of projection televisions, and more particularly to an apparatus for protecting a cathode ray tube during storage and shipment.

BACKGROUND OF THE INVENTION

In projection television (PTV) applications, a high intensity light beam with a video image is projected through a series of lenses onto a viewing plane. To preserve image quality, the surfaces of the lenses must be kept free of dirt, dust, and smudges that can result from direct handling of the PTV during movement and storage.

Consequently, an additional planar protective element is typically attached over the surfaces to be protected during the manufacturing and shipping process and removed when the PTV is installed at a destination location. Conventional protective planar elements are typically attached to the PTV using adhesive or mechanical fastening elements. This results in time being added to the manufacturing and installation process, which together with the adhesives and fastening elements add unnecessary cost to the finished PTV.

Fasteners and spacers are conventionally used to mount the lenses in a PTV chassis enclosure. However, at present, such conventional mounting apparatus do not include means for holding a protective element It is therefore an object of the present invention to provide such an apparatus which will eliminate the need for a separate manufacturing step to add the protective element, thereby reducing the number of fabrication steps, the materials required, and thus the cost of a PTV.

SUMMARY

An integrated support apparatus for semi-rigidly attaching a planar protective element to a lens assembly and chassis in a projection television (PTV). The apparatus can be extruded from a PVC material. The apparatus includes an attachment interface comprising a multitude of channels each being constructed to accept in mating arrangement one or more lenses and/or protective elements along an edge dimension of the lenses and/or protective elements.

The apparatus can include molded protrusions that can be arranged to apply retentive pressure against major planar surfaces of the lenses and/or protective element to be attached and supported in the receiving channels. Both rigid structural elements and resilient padding elements of the apparatus can be manufactured together by simultaneously co-extruding a rigid PVC material and a resilient PVC material, respectively. The apparatus can further include protrusions for special separation boundaries in the PTV.

DETAILED DESCRIPTION OF THE INVENTION

Figure 1:
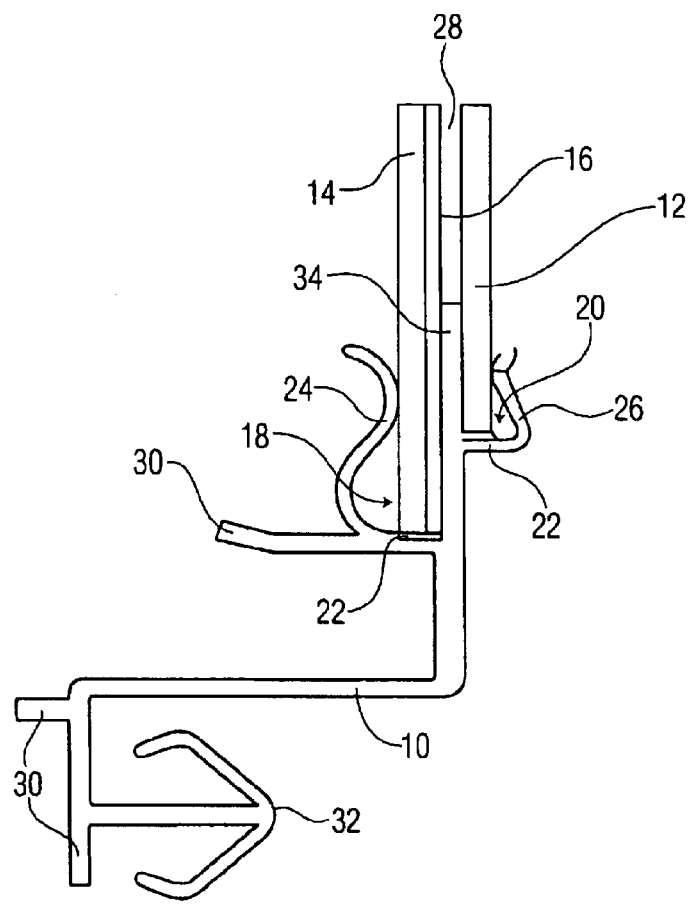
FIG. 1 shows a side view of a first exemplary embodiment of a mounting apparatus for a projection television (PTV) for mounting a plurality of lenses and a protective planar element in a predetermined spatial arrangement according to the present invention.

FIG. 1 shows a side view of an exemplary embodiment of a mounting apparatus 10 for selectively mounting a planar protective element 12 over an exterior surface of a focal assembly of a projection television (PTV) in a predetermined spatial arrangement according to the present invention. Element 12 is clear, thereby enabling the PTV to be viewed without having to remove element 12. Apparatus 10 is permanently mounted to the PTV, with protective element 12 able to be selectively removed from said apparatus.

The focal assembly, which is comprised of a plurality of projection lenses, e.g., a fresnel lens 14 and a lenticular lens 16, is preferably supported and retained in a channel-like mounting slot 18 in a generally rigid manner. Similarly, protective element 12 is supported and retained in a second channel-like mounting slot 20. Apparatus 10 can include any number of mounting slots. One or more resilient pads 22 can be added to apparatus 10 to cushion the interfaces of the focal assembly and protective element 12, respectively, from the weight of such elements. Pads 22 are not required in all applications, and their use will depend on the characteristics of a particular element being supported, i.e. weight, fragility, etc. Pads 22 can be separately attached when used.

A first resilient, semi-rigid protrusion 24 is preferably included to hold the focal assembly in place with sufficient lateral force in mounting slot 18, so that lenses 14 and 16 cannot move, either as an integrated focal assembly or one lens relative to the other. Planar protective element 12 can also be frictionally supported to the same degree using second resilient protrusion 26. The structure of protrusions 24 and 26 can be designed so that they exert sufficient lateral pressure in the desired direction. This will normally involve either an angular orientation of protrusions 24 and 26 relative to the mounting plane and/or a curved or coiled structural arrangement. As shown in the figures, the semi-rigid protrusions are curved along parallel inner and outer surfaces.

Apparatus 10 can also include predetermined spacing or gaps between protective element 12 and lenses 14 and 16, using planar separating protrusions that comprise the outer walls of mounting slots 18 and 20. Such spacing prevents protective element 12 and lenses 14 and 16 from being damaged during drops, bumps and routine movement of the PTV. FIG. 1 shows an exemplary 1.5 mil air gap 28 between the front of the lens assembly and protective element 12. It should be noted that although FIG. 1 shows a non-spacer arrangement between fresnel lens 14 and lenticular lens 16, a particular application can include spacers and still be within the scope of the invention. To properly fit and secure apparatus 10 within a PTV chassis, various standoffs 30 and hooks or snaps 32 can also be included as part of apparatus 10. As shown in the figures, both the chassis snap connector 32 and the standoffs 30 are isolated from the first and second semi-rigid protrusions. In addition, in the illustrated embodiment, the chassis snap connector is oriented at an orthogonal angle with respect to the mounting slots.

Figure 2:
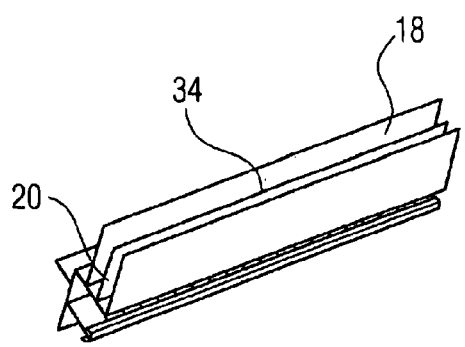
FIG. 2 shows a perspective view of a section of the mounting apparatus shown in FIG. 1.

FIG. 2 shows a perspective view of a section of the mounting apparatus 10 shown in FIG. 1. As shown in FIG. 2, apparatus 10 includes slots 18 and 20 for receiving and retaining the focal assembly comprised of fresnel lens 14 and lenticular lens 16, and planar protective element 12 with separator 34 juxtaposed between them. Like the other components of apparatus 10, separator 34 is an extruded component. The finished apparatus 10 is then cut to an appropriate length.

Apparatus 10 can be quickly and inexpensively fabricated using conventional extrusion methods. Apparatus 10 is preferably fabricated from extruded PVC, although it can be fabricated from any similar material. Pads 22 are preferably fabricated from a heat-resistant and chemically treated portion of apparatus 10. Alternatively, pads 22 can be fabricated from simultaneous co-extrusion of a flexible PVC material and a rigid PVC material.

Once apparatus 10 is fabricated, lenses 14 and 16 can be installed in mounting slot 18 in a clean-room environment to prevent dust contamination of the assembly. The lens/mounting slot assembly can then be installed in the PTV chassis. After the lens/mounting slot assembly is installed, planar protective element 12 can be installed into slot 20. The PTV will then be ready for shipment and/or storage, with protective element 12 being removed from apparatus 10 when the PTV is to be used.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiments may be varied without departing from the spirit of the invention, and the exclusive use of all modifications which come within the scope of the appended claims is reserved.

What is claimed is:

1. An integrated screen and protector holder for attachment to a projection television chassis, comprising:
    a one-piece apparatus that includes a first semi-rigid protrusion, a second semi-rigid protrusion and a chassis snap connector that includes at least one hook, and said chassis snap connector being isolated from said first and second semi-rigid protrusions;
    said first semi-rigid protrusion defining a portion of a lens mounting slot; and
    said second semi-rigid protrusion defining a portion of a protector mounting slot.

2. The integrated screen and protector holder of claim 1 wherein said one-piece apparatus has a uniform cross section along a length.

3. The integrated screen and protector holder of claim 2 wherein said apparatus consists essentially of PVC material extruded in said uniform cross section.

4. The integrated screen and protector holder of claim 1 wherein said first semi-rigid protrusion and said second semi-rigid protrusion are curved along parallel inner and outer surfaces.

5. The integrated screen and protector holder of claim 1 wherein said lens mounting slot and said protector mounting slot are partially defined by opposite sides of a planar separator.

6. The integrated screen and protector holder of claim 1 wherein said one-piece apparatus includes at least one stand off protrusion that is isolated from said chassis snap connector and said first and second semi-rigid protrusions; and
    said one piece apparatus includes at least one cushion pad that defines a bottom of at least one of said lens mounting slot and said protector mounting slot.

7. The integrated screen and protector holder of claim 1 wherein said one-piece apparatus has a uniform cross section along a length that consists essentially of PVC material extruded in said uniform cross section;
    said first semi-rigid protrusion and said second semi-rigid protrusion are curved along parallel inner and outer surfaces;
    said lens mounting slot and said protector mounting slot are partially defined by opposite sides of a planar separator; and
    said chassis snap connector includes a pair of hooks.

8. The integrated screen and protector holder of claim 1 wherein said chassis snap connector is oriented at an angle, which is greater than zero, with respect to said lens mounting slot.

9. The integrated screen and protector holder of claim 8 wherein said angle is orthogonal.

10. A screen protector assembly for a projection television, comprising:
    a one-piece plastic apparatus that includes a separator that together with a first curved resilient protrusion and a second curved resilient protrusion define portions of a lens mounting slot and a protector mounting slot, respectively;
    said first curved resilient protrusion being curved along parallel inner and outer surfaces, and said second curved resilient protrusion being curved along parallel inner and outer surfaces;
    at least one lens received in said mounting slot and compressed between said first curved resilient protrusion and said separator; and
    at least one protector received in said protector mounting slot and being compressed between said second curved resilient protrusion and said separator.

11. The lens and protector support assembly of claim 10 wherein said separator includes a first planar surface in opposition to said first curved resilient protrusion, and a second planar surface that is parallel to said first planar surface and oriented in opposition to said second curved resilient protrusion.

12. The lens and protector support assembly of claim 11 including a chassis snap connector with at least one hook and being isolated from said first and second curved resilient protrusions.

13. The lens and protector support assembly of claim 12 wherein said chassis snap connector is oriented at an angle, which is greater than zero, with respect to said lens mounting slot.

14. The lens and protector support assembly of claim 13 wherein said angle is orthogonal.

15. The lens and protector support assembly of claim 11 wherein said one-piece apparatus includes an extruded length of PVC.

16. The lens and protector assembly of claim 15 wherein said one-piece apparatus has a uniform cross section along said extruded length.

17. The lens and protector support assembly of claim 11 wherein said one-piece apparatus includes at least one chassis standoff protrusion that is isolated from said first and second curved resilient protrusions.

18. The lens and protector support assembly of claim 11 wherein said one-piece apparatus includes a cushion pad in contact with said at least one lens and defining a portion of said lens mounting slot.

19. The lens and protector support assembly of claim 18 wherein said one-piece apparatus includes a cushion pad in contact with said protector and defining a portion of said protector mounting slot.

20. The lens and protector support assembly of claim 18 wherein said one-piece apparatus includes at least one chassis stand off protrusion and a chassis snap connector with a pair of hooks that are isolated from said first and second curved resilient protrusions; and
    said one-piece apparatus consists essentially of an extruded length of PVC with a uniform section.

* * * * *